United States Patent [19]

Vainstock

[11] Patent Number: 4,962,676
[45] Date of Patent: Oct. 16, 1990

[54] TWO AXIS TRANSFER DEVICE

[75] Inventor: Michael Vainstock, Marblehead, Mass.

[73] Assignee: The Gillette Company, Boston, Mass.

[21] Appl. No.: 420,580

[22] Filed: Oct. 12, 1989

[51] Int. Cl.$^5$ .................. G05G 11/00; B25J 17/00
[52] U.S. Cl. .................... 74/479; 74/89.15; 414/917; 901/25
[58] Field of Search ............ 74/89.15, 479, 521, 74/661, 665 B; 414/733, 917; 901/25

[56] References Cited

U.S. PATENT DOCUMENTS

| | | | |
|---|---|---|---|
| 2,959,301 | 11/1960 | Willsea | 214/1 |
| 3,721,416 | 3/1973 | Goudreau | 414/917 X |
| 3,865,253 | 2/1975 | Healy | 214/1 |
| 4,252,228 | 2/1981 | White | 74/521 X |
| 4,398,863 | 8/1983 | Shum | 414/733 |
| 4,435,116 | 3/1984 | Van Deberg | 414/728 |
| 4,437,635 | 3/1984 | Pham | 74/479 X |
| 4,466,307 | 8/1984 | Kouno | 74/479 |
| 4,618,309 | 10/1986 | Gregg et al. | 414/753 |
| 4,702,663 | 10/1987 | Mischke et al. | 414/618 |
| 4,819,496 | 4/1989 | Shelef | 74/89.15 X |

Primary Examiner—Allan D. Herrmann
Attorney, Agent, or Firm—Owen J. Meegan; Aubrey C. Brine; Scott R. Foster

[57] ABSTRACT

A dual axis transfer mechanism comprising a pair of motors mounted onto a frame for independently rotating a pair of threaded shafts fixed in parallel relation. Each of the shafts is threaded into a carrier member connected to one end of a respective arm, the opposite end of each arm being connected at a common pivot point. Rotation of each shaft caused by its respective motor causes movement of the carrier member threaded thereon which effects movement of the common pivot point to which a tool is attached.

16 Claims; 3 Drawing Sheets

TWO AXIS TRANSFER DEVICE

BACKGROUND OF THE INVENTION

The present invention relates to transfer devices in general, and more particularly to a programmable high speed pick and place unit of the robotic type useful in a factory environment to perform a plurality of transfer or manipulating functions.

Transfer devices have been provided in the past which provide an arm or plurality of arms which when attached to a desired tool perform the function of transferring material from one location to another, or any of a number of manufacturing operations such as painting, ribbeting, drilling, etc. However, in each of these operations, when practiced in the production environment, the requirement of speed and reliability are of the utmost importance in performing the required task or function a great many times over a long period of time.

In order to provide a transfer device of optimum speed and reliability, it is necessary to have a minimum inertia within the system combined with a limited number of elements. Many commercially available transfer mechanisms are of the two-axis type and are designed in such a way that the axis with the longer motion carries the entire drive system and is therefore inherently a high inertia system. In other devices wherein a two-axis mechanism is employed, the drive system may be embodied on a pair of movable shafts. However, the drive system is rotated or moved about with each of the shafts again providing a relatively high inertia to the system.

Additionally, while eliminating the number of moving parts in a transfer device in addition to decreasing the inertia of the entire system, the elimination of parts per say produces a machine which is simple in construction and economically produced at a savings which is multiplied by the number of devices necessary on a production line of a type employed in many manufacturing processes.

It is therefore an object of the present invention to provide a transfer device of the dual axis type having a low inertia and therefore a greater potential for high speed performance.

Another object of the invention is to provide a dual axis transfer mechanism having a minimum of movable parts to provide economical manufacture as well as low inertia to the transfer device system.

Yet another object of the invention is to provide a dual axis transfer device of the type under consideration which provides a greater amount of versatility in its employment and which is simple in operation to provide adaptability into a computerized system.

SUMMARY OF THE INVENTION

The aforementioned objects and other objects which will become apparent as the description proceeds are accomplished by providing a dual axis transfer device comprising wall structure which defines a frame having a pair of motors fixedly mounted on the frame. Each of the motors has a shaft connected thereto, the shafts being fixed in parallel relation one with the other and a pair of carrier members. A first member connected to one of the shafts and a second member connected to the other of said shafts are provided along the shafts. A pair of arms interconnect the carrier members and are connected one to the other at a common pivot point such as the energizing of a motor is effective to move the common pivot point relative to the frame through movement of the carrier members in one direction or another along its respective shaft.

In a more detailed aspect, an auxiliary arm and a first and second linkage are provided to form a parallelogram with the arm connecting the first carrier member and the pivot point. The first linkage member is fixed relative to the frame and the tool member is fixed to the second linkage member such that the tool remained oriented in a predetermined direction in relation to the frame during movement of the common pivot point relative to the frame.

The frame may comprise a pair of side panels which contain guide members on which are mounted supports for the carrier members, the supports being effective to transfer the load on the carrier members into the frame panels rather than into the parallel shafts.

BRIEF DESCRIPTION OF THE DRAWING

The foregoing and other features of the invention will be more particularly described in connection with the preferred embodiment and with reference to the accompanying drawing, wherein.

DESCRIPTION OF THE PREFERRED EMBODIMENT

Figure 1:
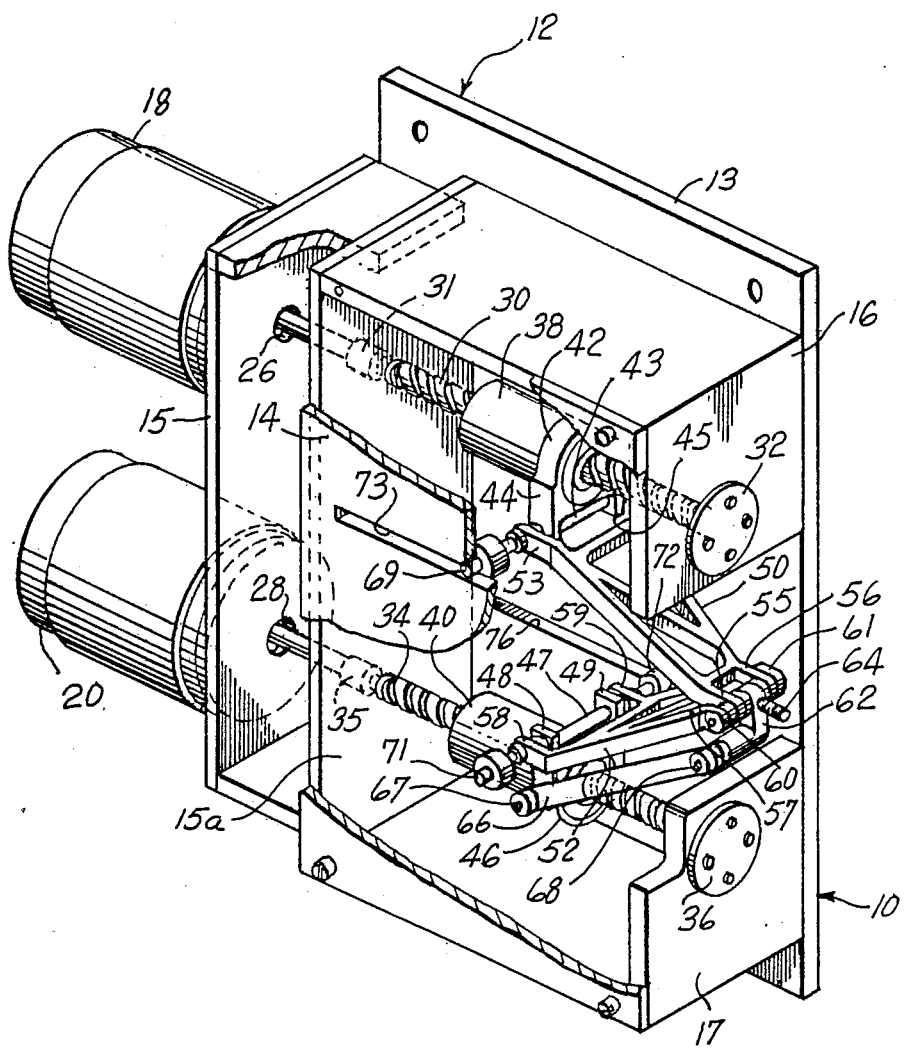
FIG. 1 is an elevated perspective view showing a transfer device embodies the teachings of the present invention.

Referring now to the drawing and in particular to FIG. 1, there is shown a two axis transfer device 10 having a frame 12 having a side panels 13 and 14, a rear panel 15 and a pair of front panels 16 and 17. A pair of motors 18 and 20 are mounted on the panel 15, each having its respective motor shaft 22 and 24 extending inwardly of the frame 12 through respective openings 26 and 28 in the rear panel. A threaded shaft 30 has one end connected to the motor shaft 22 by a coupling 31 and the opposite end thereof received in a bearing formed in the bearing housing 32 mounted on the front panel 16. A second threaded shaft 34 is provided disposed in parallel relation with the shaft 30 having one end thereof connected to the motor shaft 24 by a coupling 35 and the opposite end received in a bearing formed in the bearing housing 36 mounted on the front panel 17.

A first carrier member 38 having internal threads is received onto the shaft 30 and a second carrier member 40 likewise is threadably received onto the threaded shaft 34. At the forward end of the carrier member 38, there is disposed a collar 42 having a shaft 43 supported between a pair of legs 44 and 45, the shaft 43 extending outwardly on either side of the collar 42. A similar collar 47=6 is mounted at the forward end of the carrier member 40 and has an axle 47 mounted between the legs 48 and 49, the axle 47 extending in like manner from either side of the collar 46 outwardly toward the side panels 13 and 14 of the frame 12.

Figure 4:
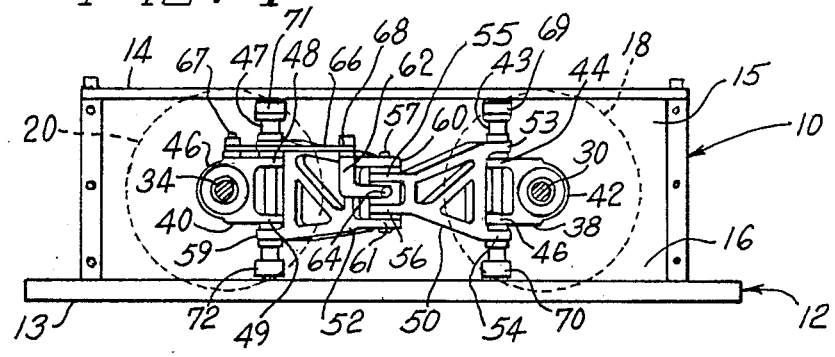
FIG. 4 is an elevational sectional view taken along the line IV—IV of FIG. 2 showing elements of the device of FIGS. 1 through 3.
Figure 5:
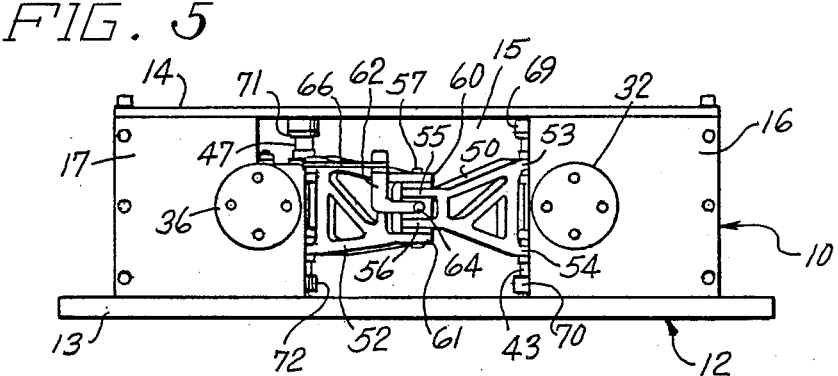
FIG. 5 is a front elevational view of the device of FIGS. 1 through 4 rotated through 90° showing further details of the device.
Figure 6:
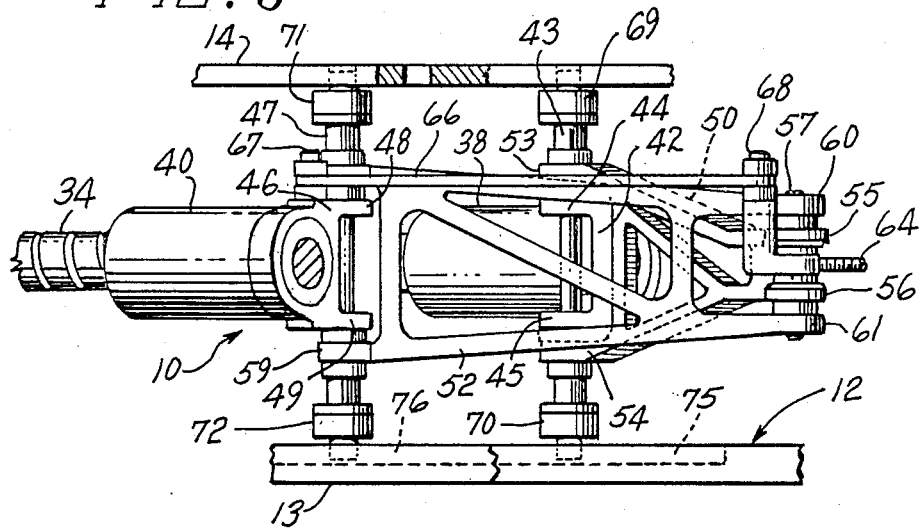
FIG. 6 is an oblique sectional view taken along the line VI—VI of FIG. 2 showing elements of the device taken on an elongated scale for clarity.

Referring still to FIG. 1 taken in conjunction with FIGS. 4, 5 and 6, the device 10 further comprises a pair of yokes 50 and 52 with connecting the carrier members 38 and 40 through a common pivot point. The yoke 50 has a pair of flanges 53 and 54 which are pivotably received on the axle 43 and at the opposite end thereof, a pair of flanges 55 and 56 are pivotably received on a pin 57. In like manner, the yoke 52 comprises a pair of flanges 58 and 59 pivotably received on the axle 47 and at the opposite end thereof, a pair of flanges 60 and 61 pivotably received on the pin 57. The pin 57 provides a common pivot point for the arms of the device in the form of yokes 50 and 52 and a link member 62 is also pivotably received on the pin 57, the link 62 supporting a tool 64 extending outwardly therefrom at the centerline of the pin 57.

The tool 64 is shown as a threaded rod in the embodiment under discussion. However, it should be evident that the threaded rod in the form of tool 64 is susceptible to attachment to a plurality of working elements such as equipment to provide welding, component insertion, painting, or any number of functions employed in a production environment.

In order to maintain the tool 64 in a fixed orientation relative to the frame 12, an auxiliary arm 66 is provided having one end thereof pivotably attached to the collar 46 and the opposite end thereof pivotably attached to the link member 62. The attach point 67 of the auxiliary arm at the collar 46 is spaced a distance from the location of the axle 47 and the attach point 68 of the opposite end of the auxiliary member 66 at the link member 62 is spaced equidistant from the axal 47 and the pin 57, and the length of the auxiliary arm 66 is equal to the length of the yoke 52 such that the auxiliary arm 66, the yoke 52, the collar 46 and the link member 62 form to provide a linkage in the form of a parallelogram. Thus, with the one side of the parallelogram formed by the collar 46 remaining fixed in orientation relative to the frame 12, the link member 62 and consequently the tool 64 will remain in that orientation which is originally built into the structure. Therefore, any device mounted on the tool 64 will retain its orientation relative to the frame 12 during operation of the device 10, as will be described below.

Referring to FIGS. 1 and 6, taken with the remaining figures, each of the axles 43 and 47 extends outwardly from its respective collar 42 or 46 and has disposed at the outer extremity thereof a pair of rollers 69 and 70 disposed on the axle 43 and 71 and 72 disposed on the axle 47. Guide means in the form of a pair of slots 73 and 74 formed in the side panel 14 and slots 75 and 76 formed in the panel 13 are provided to receive the rollers 69, 70, 71 and 72 therein to provide support means for the assembly during operation of the device 10. The support means comprising the rollers 69, 70, 71 and 72 retained in the slots 73, 74, 75 and 76 is effective to absorb downward or upward loading of the yokes 50 and 52 during operation of the unit and therefore to decrease the friction between the carrier members 38 and 40 and their respective threaded shafts 30 and 34.

Figure 2:
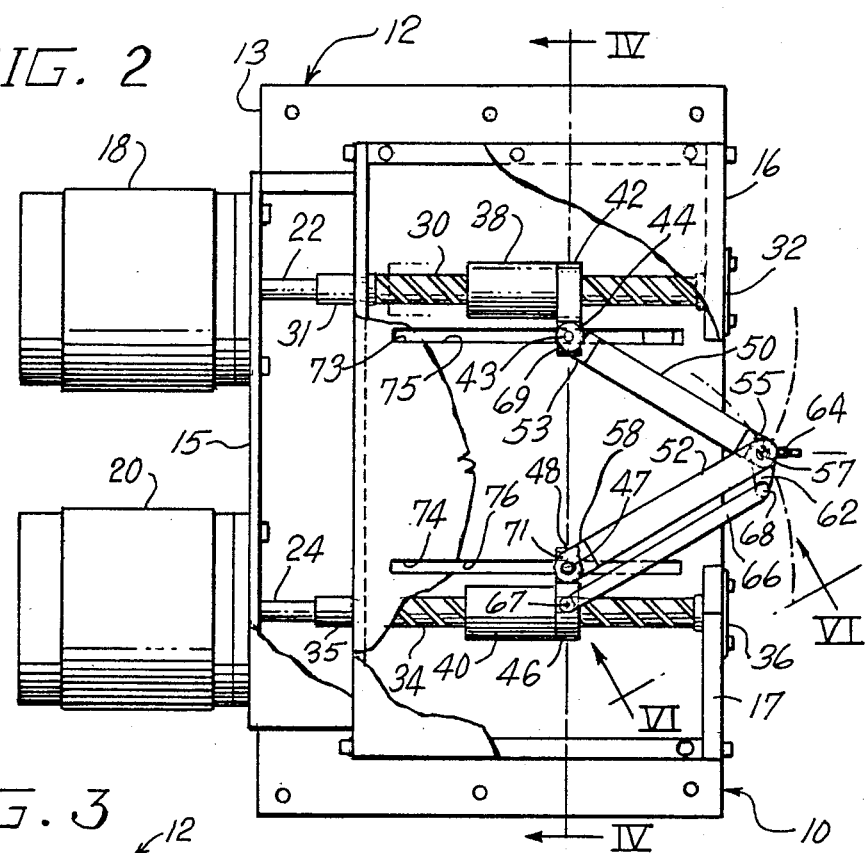
FIG. 2 is a right side elevational view, partially in section, showing details of the structure of FIG. 1.
Figure 3:
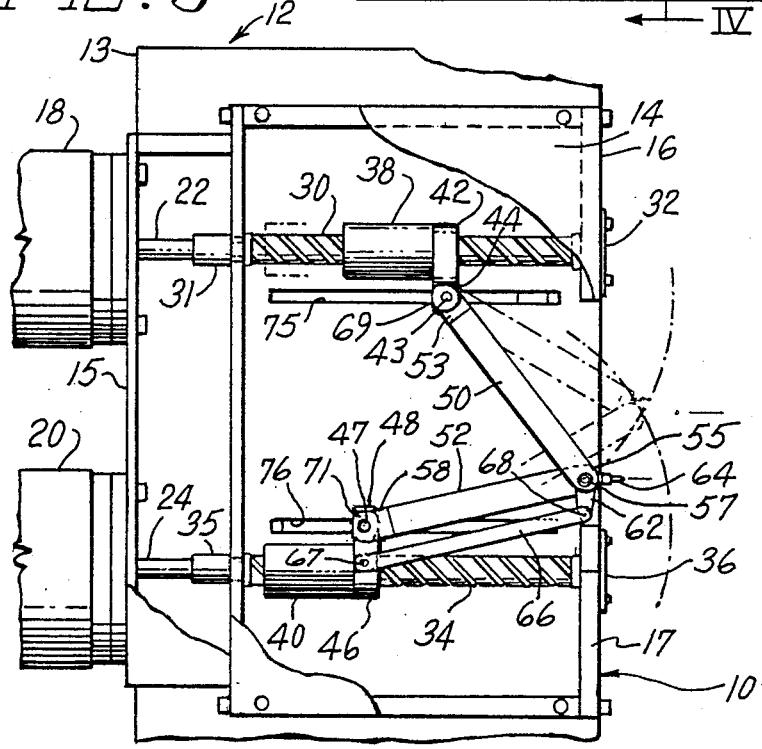
FIG. 3 is a right side elevational view, partially in section and similar to FIG. 2, showing further details of the invention.

Referring now to FIGS. 2 and 3, there is shown the two axis transfer device 10 during operation of the unit to locate the tool 64 at a plurality of positions.

The motors 18 and 20 may be of any variety of stepping motor which is susceptible to operation through a computer program such as is well known in the art. Thus, the motor 18 may be operated in one direction while the motor 20 turns in the opposite direction and vice versa to cause the carrier members 38 and 40 to move along the respective shafts 30 and 34. The motors 18 and 20 may also be operated in the same rotational direction to move the carrier members 38 and 40 inwardly or outwardly relative to the frame 12, as will be evident in viewing the dot-dash lines of FIGS. 2 and 3. It will also be observed that the tool 64 which herein is represented as extending substantially parallel to the parallel shafts 30 and 34, retains its orientation relative to the frame 12 by virtue of the parallelogram comprising the link member 62 and the yoke 52 as opposed parallelogram sides and the collar 46 and link member 62 as the other pair of opposed sides of the parallelogram.

During operation of the two axis transfer device 10, it will be appreciated that neither the motors 18 or 20, or the shafts 30 or 34 are moved relative to the frame 12. Therefore, these items may be of a size and strength which is not allowable in other devices of the prior art without sacrificing a minimum inertia in the system. It is therefore considered that the present invention provides an improved transfer device which is simple in construction and low in inertia thereby satisfying the objectives of the invention.

It is apparent that changes and modification may be made within the spirit and scope of the present invention but it is my intention, however, only to limited by the scope of the appended claims.

As my invention, I claim:

1. A dual axis transfer device comprising:
   wall structure defining a frame means;
   a pair of motor means fixedly mounted on said frame means, each said motor means having a shaft connected thereto, said shafts being fixed in parallel relation one with the other;
   a pair of carrier members, a first carrier member being connected to one said shaft and a second carrier member being connected to the other said shaft, for movement along said shafts;
   a pair of arms interconnecting said carrier members and connected one to the other at a common pivot point, whereby the energizing of a motor means is effective to move said common pivot point relative to said frame means.

2. A dual axis transfer device as set forth in claim 1 wherein each said shaft comprises a continuous screw thread disposed on the outer surface thereof, said screw threads being received in mating screw threads disposed in a said respective carrier member to cause movement of a carrier member along a respective shaft upon rotation of a said respective shaft.

3. A dual axis transfer device as set forth in claim 1 wherein each said motor means is a rotary motor having a respective shaft connected directly to said motor shaft.

4. A dual axis transfer device as set forth in claim 1 which further includes a tool member disposed at said common pivot point, said tool member being oriented in a predetermined direction relative to said frame means.

5. A dual transfer device as set forth in claim 4 which further includes an auxiliary arm having one end thereof connected to said first carrier member by a first linkage member and the opposite end thereof pivotably connected to a second linkage member in turn pivotably connected to said arms at said pivot point, and wherein said tool member is fixed to said second linkage member.

6. A dual transfer device as set forth in claim 5 wherein said auxiliary arm and said first and second linkage members form a parallelogram with said arm interconnecting said first carrier member and said pivot point, said first linkage member being fixed relative to said frame means whereby said tool remains oriented in said predetermined direction in relation to said frame during movement of said common pivot point relative to said frame means.

7. A dual axis transfer device as set forth in claim 1 wherein said frame means comprises a pair of side panels and each of said arms is a yoke member disposed between said side panels.

8. A dual axis transfer device as set forth in claim 7 wherein each of said side panels comprises guide means disposed thereon parallel with said shafts and further comprising support means extending laterally from each side of each said carrier member along a respective shaft.

9. A dual axis transfer device as set forth in claim 8 wherein said guide means comprises a pair of tracks disposed one on each side of each of said carrier members and said support means comprises a shaft extending outwardly on either side of each of said carrier members at the point of connection of each said carrier member to a respective arm.

10. A dual axis transfer device as set forth in claim 2 wherein each said motor means is a rotary motor having a respective shaft connected directly to said motor shaft.

11. A dual axis transfer device as set forth in claim 10 which further includes a tool member disposed at said common pivot point, said tool member being oriented in a predetermined direction relative to said frame means.

12. A dual axis transfer device as set forth in claim 11 which further includes an auxiliary arm having one end thereof connected to said first carrier member by a first linkage member and the opposite end thereof pivotably connected to a second linkage member in turn connected to said arms at said pivot point, and wherein said tool member is fixed to said second linkage member.

13. A dual axis transfer device as set forth in claim 12 wherein said auxiliary arm and said first and second linkage members form a parallelogram with said arm interconnecting said first carrier member and said pivot point, said first linkage member being fixed relative to said frame means whereby said tool remains oriented in said predetermined direction in relation to said frame during movement of said common pivot point relative to said frame means.

14. A dual axis transfer device as set forth in claim 13 wherein said frame means comprises a pair of side panels and each of said arms is a yoke member disposed between said side panels.

15. A dual axis transfer device as set forth in claim 14 wherein each of said side panels comprises guide means disposed thereon parallel with said shafts and further comprising support means extending laterally from each side of each said carrier member for contacting said guide means moving therealong during movement of each said carrier member along a respective shaft.

16. A dual axis transfer device as set forth in claim 15 wherein said guide means comprises a pair of tracks disposed one on each side of each of said carrier members and said support means comprises a shaft extending outwardly on either side of each of said carrier members at the point of connection of said carrier member to a respective arm.

* * * * *